(No Model.)
W. D. CROWELL.
WEED ATTACHMENT FOR PLOWS.
No. 449,465. Patented Mar. 31, 1891.
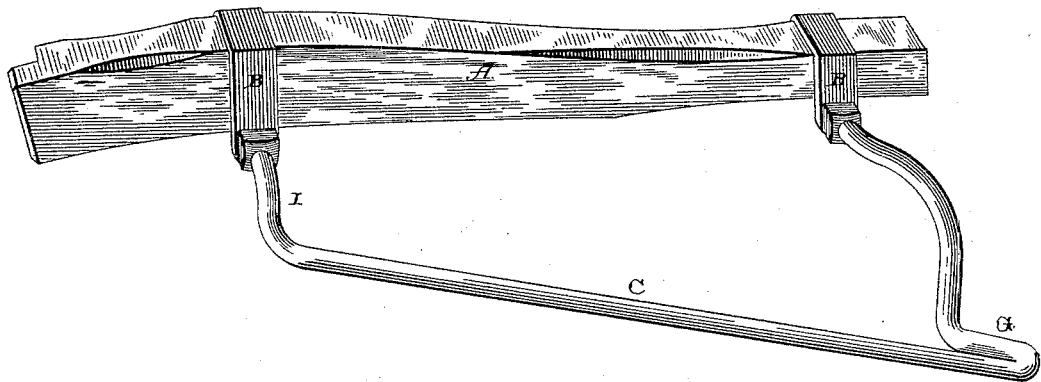
Witnesses:
E. P. Ellis,
J. M. Nesbit
Inventor.
W. D. Crowell,
per Lehmann & Pattison,
Atty.

UNITED STATES PATENT OFFICE.

WILLIAM DANIEL CROWELL, OF WESTON, KENTUCKY.

WEED ATTACHMENT FOR PLOWS.

SPECIFICATION forming part of Letters Patent No. 449,465, dated March 31, 1891.

Application filed December 16, 1890. Serial No. 374,940. (No model.)

*To all whom it may concern:*

Be it known that I, WILLIAM DANIEL CROWELL, of Weston, in the county of Crittenden and State of Kentucky, have invented certain new and useful Improvements in Weed Attachments for Plows; and I do hereby declare the following to be a full, clear, and exact description of the invention, such as will enable others skilled in the art to which it pertains to make and use it, reference being had to the accompanying drawing, which forms part of this specification.

My invention relates to an improvement in weed attachments for plows; and it consists in the construction hereinafter described, and pointed out in the claim.

The object of my invention is to attach to the beam of a plow a metallic rod which is so shaped as to mash down the weeds, so that the plow will effectually cover them up.

The accompanying drawing represents a perspective of a device which embodies my invention.

A represents the beam of the plow, and secured to this beam in the rear of the clevis and in front of the standard are the clamps B, by means of which the rod C is secured to the beam. The front end of this rod extends farther from the side of the beam than its rear one, so as to form an inclined surface against which the weeds catch for the purpose of forcing them into a position just in front of the mold-board. The front end of the rod is curved upward and downward, so as to form a bow under which the tops of the weeds will freely pass, so as to catch against the inclined surface of the rod. To the front end of this weed-turner is formed the point or extension G, which is inclined outward and which extends over the furrow to catch any weeds that may be hanging over it, and thus raise them into position so as to be caught by the horizontal portion of the rod. At the rear end of the rod it is bent or curved downward at I just in front of the mold-board, so as to press the weeds down into position so that the plow will turn them under.

This weed-turner may be applied to either side of the beam, a slight change only being required in the shape of the rod for this purpose.

The advantage of this invention consists in doing away with the log-chain or block which has heretofore been used dragging on the ground, and which is very heavy on the team. A very light rod will answer every purpose and add little or nothing to the work of the team.

Having thus described my invention, I claim—

The combination of the beam with a rod which has its ends secured thereto, the front end of the rod being bowed and provided with a point or extension and having its rear end curved downward, the main portion of the rod being straight and placed at a suitable inclination to the side of the beam, its front end diverging farthest therefrom, substantially as shown.

In testimony whereof I affix my signature in presence of two witnesses.

WILLIAM DANIEL CROWELL.

Witnesses:
 D. WOODS,
 W. B. RANKIN.